Oct. 4, 1932.  H. W. HEM  1,880,445
WEIGHING SCALE
Filed Sept. 24, 1930  2 Sheets-Sheet 1
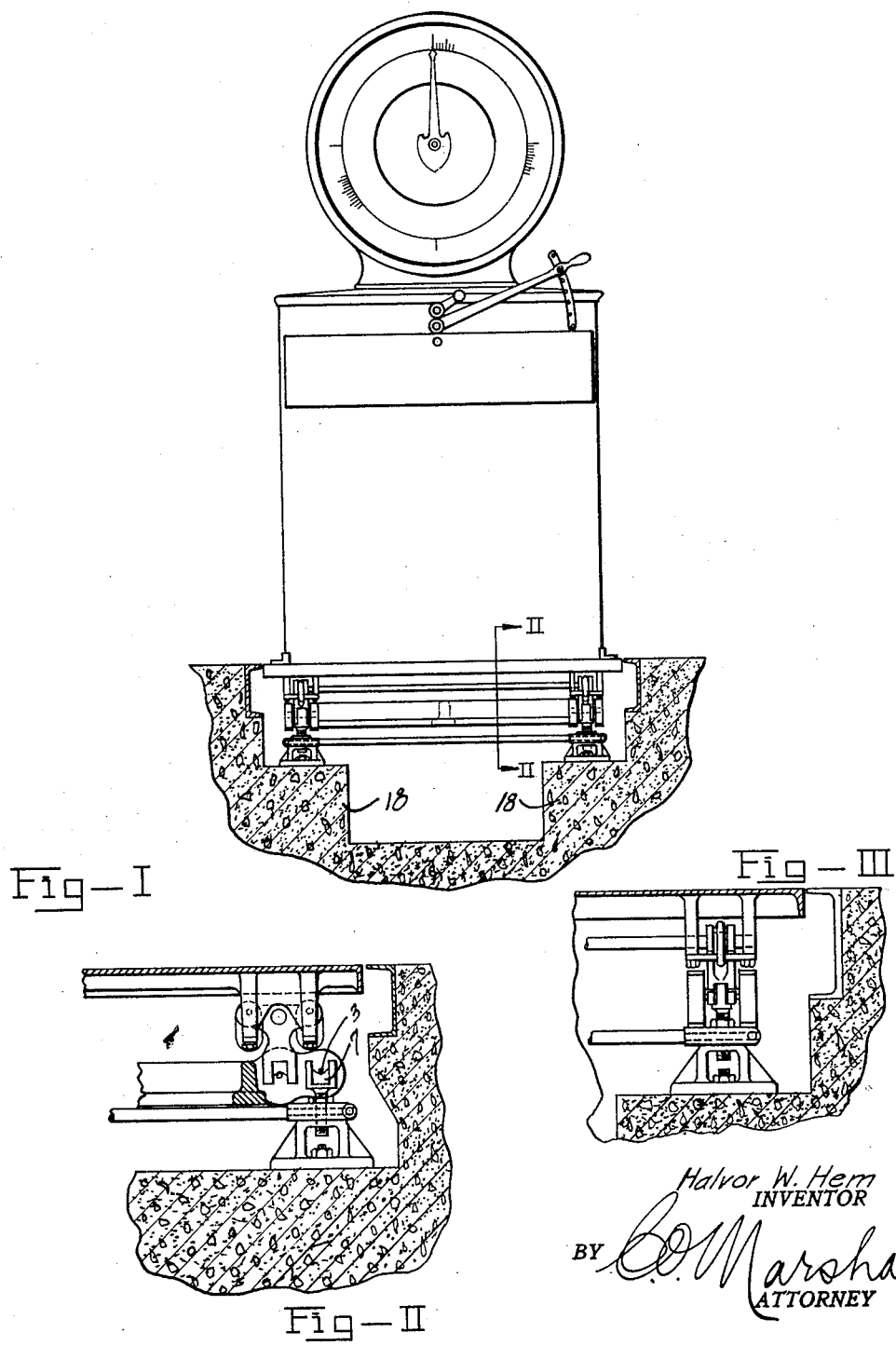

Oct. 4, 1932. H. W. HEM 1,880,445
WEIGHING SCALE
Filed Sept. 24, 1930 2 Sheets-Sheet 2
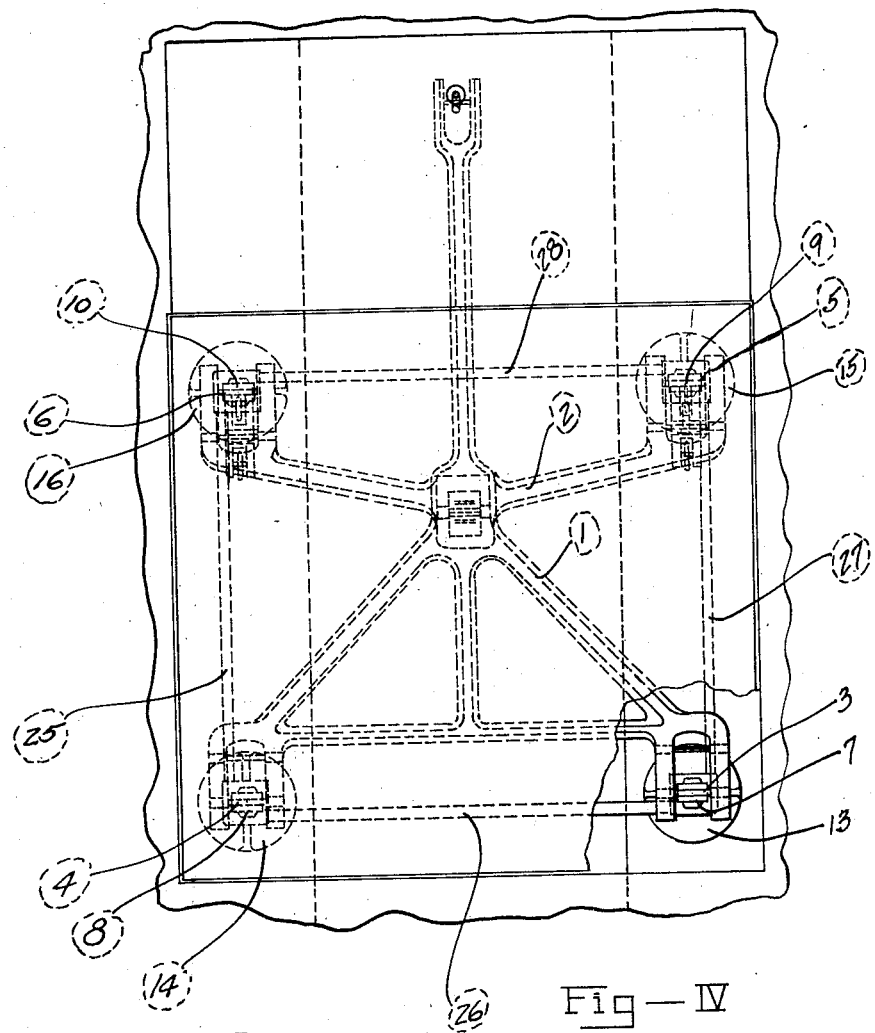
Fig—IV
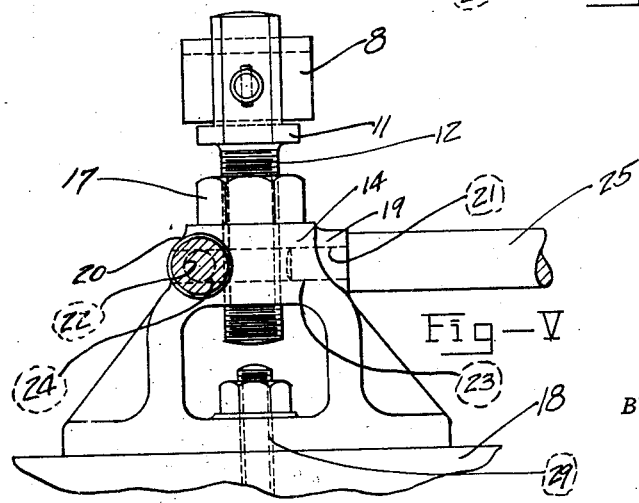
Fig—V
Halvor W. Hem
INVENTOR
BY Marshall
ATTORNEY Patented Oct. 4, 1932

1,880,445

UNITED STATES PATENT OFFICE

HALVOR W. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed September 24, 1930. Serial No. 484,081.

This invention relates to improvements in weighing scales and particularly to weighing scales of the type having built-in-platforms, such as are extensively used in factories, warehouses, builders' supply yards and kindred industries.

The load receiving lever mechanisms are generally mounted upon piers in concrete or masonry pits. It is obvious that concrete or masonry piers cannot be built to such precise dimensions as are required for accurate weighing scales in which all the levers and parts must be in accurate relation with each other. It is also difficult, in scale pits of this type, to accurately locate the holes for the reception of the fulcrum bracket retaining bolts supporting the scale levers, and thus in assembling scales in pits of this type, much costly time is consumed.

One of the principal objects of this invention, therefore, is the provision of means whereby a load supporting lever mechanism for built-in scales may be accurately placed and positioned upon inaccurate and out-of-level supports.

Another object is the provision of means for assembling the fulcrum brackets for the levers in accurate relation with each other without resorting to difficult operations within the scale pit.

Another object is the provision of means whereby the positions of the different supporting members for the load lever mechanism are predetermined.

A still further object is the provision of means enabling the scale manufacturer to effect economies in the production of scales of the type described.

Other objects and advantages will be apparent from the following description in which reference is had to the accompanying drawings illustrating a preferred embodiment of the invention and wherein similar reference numerals designate similar parts throughout the several views.

Figure I is a front elevational view partially in section of a scale of the type referred to.

Figure II is an enlarged cross sectional view through the pit substantially along the line II—II of Figure I.

Figure III is another enlarged cross sectional view showing in greater detail some of the parts illustrated in Figure I.

Figure IV is a plan view, a portion broken away, of the platform mechanism for a scale of the type referred to.

Figure V is an enlarged side elevational view of a lever supporting bracket, showing fragments of spacing rods.

Referring to the drawings in detail, I have shown my invention in combination with a well known automatic load counterbalancing and indicating mechanism which is fully described in United States Patent No. 1,423,660 to H. O. Hem and will therefore, give no detailed description of its operation. It is to be understood, however, that any type of load counterbalancing device may be used in connection with the platform supporting mechanism embodying the invention. In carrying out the invention, the load supporting levers 1 and 2 are supported by means of the fulcrum pivots 3, 4 and 5, 6 on the alignable fulcrum bearings 7, 8 and 9, 10. These bearings are secured in bifurcated holders 11, provided with stems 12, which are threaded through apertures in fulcrum brackets 13, 14 and 15, 16. It will be readily seen that if the piers 18, upon which the fulcrum brackets 13, 14 and 15, 16 are supported, are not all of equal height, the bearing holders 11 may be adjusted so that the bearings 7, 8 and 9, 10 lie in parallel horizontal planes and be locked in adjusted position by the lock nut 17 and thus support the levers in their correct positions.

The improved construction so far described assures an accurate position of the levers in horizontal planes. To assure ease of installation and accuracy of operation, it is also necessary that the fulcrum brackets 13, 14 and 15, 16 be located in correct positions with reference to the center lines of the lever system. As has been previously stated, this is a difficult operation when installing these brackets in the pit, due mainly to the comparatively crude workmanship and rough dimensions. According to the invention, this operation is greatly simplified by providing the brackets 13, 14 and 15, 16 with suitable bosses 19 and 20 having perpendicular faces in which apertures 21 and 22 are provided for the reception of turned down portions 23 and 24 of the spacing rods 25, 26 and 27, 28. The turned down portions of the rods form shoulders and the distance between the two shoulders on each of the spacing rods is so proportioned that when the brackets and the rods are assembled, the bearings 7, 8 and 9, 10 are in the correct location for the reception of the fulcrum pivots 3, 4 and 5, 6 and it is now an easy matter to accurately lock and drill holes in the piers 18 for the reception of the retaining bolts 29.

It will be seen from the foregoing that all of the objects primarily stated are effectively fulfilled. The embodiments of the invention herein shown and described are to be regarded as illustrative only and it is to be understood that the invention is susceptible to variation, modification and change within the spirit and scope of the subjoined claims.

Having described my invention, I claim:

1. In a weighing scale of the type described, in combination, a load supporting lever mechanism comprising a plurality of levers, a plurality of brackets adapted to stand on a support and an adjustable member having a bearing for a pivot associated with each of said brackets, said adjustable members having threaded stems which are adapted to be screwed into said brackets and means for locking said members in adjusted position.

2. In a weighing scale of the type described, in combination, a load supporting lever system including a fulcrum bearing bracket adapted to stand upon a support, said bracket having means in spaced relation for the reception of spacing or locating means.

3. In a weighing scale of the type described, in combination, a load supporting lever mechanism comprising a lever and a plurality of fulcrum brackets adapted to stand on a support, means for spacing said plurality of fulcrum brackets and means on said brackets to receive said spacing means.

4. In a weighing scale of the type described, in combination, a load supporting lever mechanism comprising a plurality of levers having fulcrum pivots in spaced relation, a plurality of brackets having fulcrum bearings, means for adjusting said bearings in horizontal planes and means predetermining the position of said bearings with reference to said fulcrum pivots.

HALVOR W. HEM.